United States Patent [19]

Hungerford

[11] Patent Number: 4,872,112
[45] Date of Patent: Oct. 3, 1989

[54] RECIPE CALCULATOR

[76] Inventor: Roger D. Hungerford, 4645 Clover Meadows Dr., Meridian, Id. 83642

[21] Appl. No.: 223,957

[22] Filed: Jul. 25, 1988

[51] Int. Cl.⁴ .............................................. G06F 15/42
[52] U.S. Cl. ................................ 364/400; 364/709.07; 364/413.29
[58] Field of Search .................. 364/400, 413, 709.07, 364/709.03, 715.01, 567, 705.01

[56] References Cited

U.S. PATENT DOCUMENTS

| | | | |
|---|---|---|---|
| 4,100,602 | 7/1978 | Shapiro | 364/709.03 |
| 4,244,020 | 1/1981 | Ratcliff | 364/709.03 X |
| 4,636,949 | 1/1987 | Longabaush | 364/400 |
| 4,649,810 | 3/1987 | Wong | 364/400 X |

FOREIGN PATENT DOCUMENTS 1173164  8/1984  Canada ........................... 364/709.07

*Primary Examiner*—Michael R. Fleming
*Attorney, Agent, or Firm*—Frank J. Dykas; Craig M. Korfanta

[57] ABSTRACT

A recipe calculator 10 having a keyboard 24, display 22, and microcontroller 23 which includes microprocessor 25, ROM 26, RAM 27 and display driver 28, provides an apparatus for calculating food ingredient ratios and carrying out measuring unit conversions when a recipe serving size alteration is desired. Recipe calculator 10 is configured to faciliate single stroke calculations wherein its use is self-evident and requires no special training. Keyboard 24 provides a ten-key numeric keypad 11, a six-key fractional keypad 12, a five-key units keypad 13 and eight function keys 14 through 21.

12 Claims, 2 Drawing Sheets

RECIPE CALCULATOR

BACKGROUND OF THE INVENTION

1. Technical Field

This invention generally relates to calculators and more specifically to a recipe calculator designed for calculating food ingredient ratios and presenting the ingredient amounts in their most convenient form.

2. Background Art

A common problem in cooking, whether cooking for one person or many people, is the conversion of the ingredient amounts of a given recipe to the necessary amounts for a different serving size. A typical example might be a certain recipe originally designed to produce six servings while only two servings are needed. The recipe calls for two-thirds of a cup of a specific ingredient. Dividing two-thirds of a cup by three results in two-ninths of a cup of the ingredient. Most kitchens are not equipped to handle an odd sized measurement such as two-ninths of a cup. Therefore, the cook has to convert two-ninths of a cup to the corresponding number of tablespoons and/or teaspoons. This task is so burdensome that many a cook opt for the easiest possible serving size reduction which in this case would result in three servings instead of the desired two servings. In fact, a large number of people when faced with simply doubling a recipe, will separately mix up two complete batches of the recipe and then combine them for cooking.

As in virtually every other aspect of homemaking, electronics technology has filtered into the culinary art in the form of cooking control systems. Two such electronic control devices are taught by LONGABAUGH, U.S. Pat. No. 4,636,949 and WONG, U.S. Pat. No. 4,649,810. LONGABAUGH teaches a method and apparatus for controlling cooking cycles in an apparatus, such as a deep fat fryer, which provides the capability of lengthening or shortening or changing the ending temperature of a cooking cycle without changing the overall cycle. WONG teaches an automatic cooking apparatus wherein a microcomputer controlled apparatus automatically prepares a specific dish by introducing the ingredients at their specified times and controlling the necessary temperatures. Neither of the devices however, teach an apparatus for calculating ingredient ratios and measuring unit conversions.

What is needed is an apparatus capable of converting a recipe of a given serving size to a proportionate recipe of reduced or increased serving size by providing the new ingredients in their most convenient size units, and further an apparatus which is easy to use and requires no special training.

It is therefore an object of the present invention to provide a recipe calculator which is capable of converting a recipe of given serving size to a recipe of alternate serving size by providing the necessary ingredient amounts in their most convenient size units. A secondary object of this invention is to provide an alternate display mode which provides the proper ingredient amount in an alternate size unit. A further object of this invention is to provide a recipe calculator which is easy to use, requiring no special training, and has self-evident built-in function keys which facilitate single key stroke results.

DISCLOSURE OF INVENTION

These objects are accomplished by a recipe calculator using a microcontroller configured for calculating ingredient ratio amounts and providing unit conversion. A numeric keypad is provided for inputting whole digits into the microcontroller, while a fractional keypad is provided for inputting fractional digits into the microcontroller. A units keypad is provided for inputting units such as cups, pounds, etc., and a plurality of control keys are provided for inputting control codes into the microcontroller. A display means, such as a liquid crystal display or a light emitting diode alphanumeric display, is provided for displaying the output of the microcontroller, The microcontroller includes a read only memory (ROM) device which harbors permanent control code for controlling the operation of the microcontroller.

BEST MODE FOR CARRYING OUT INVENTION

Figure 1A:
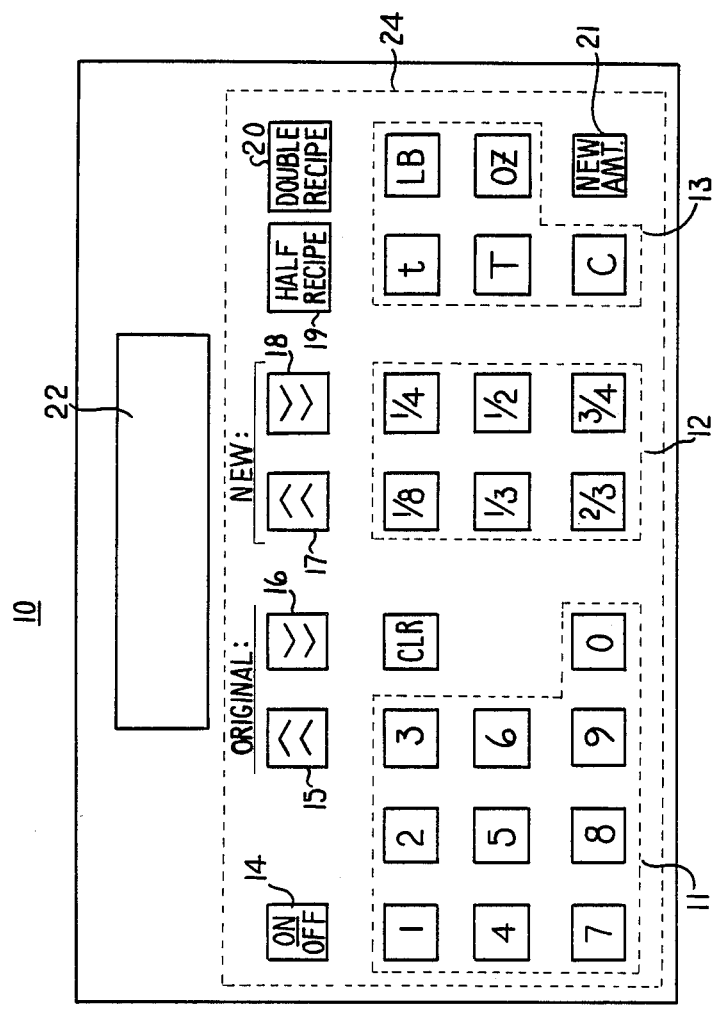
FIG. 1a is a top plan view of a recipe calculator.

One preferred keyboard layout for a recipe calculator 10, is shown in FIG. 1a. Recipe calculator 10 has located thereon a ten-key numeric keypad 11, six-key fractional keypad 12, a five-key units keypad 13, a plurality of control keys, in this case, keys 14 through 21, and a suitable display device 22 such as an alphanumeric light emitting diode display or a liquid crystal display (LCD). Ten-key numeric keypad 11 consists of ten individual keys each corresponding to a single integer digit "0" through "9". Fractional keypad 12 has six keys, each of which correspond to an individual fraction of the set: "⅛", "¼", "½", "¾", "⅓", and "⅔". Units keypad 13 has five keys, each of which correspond to a separate unit of measure where each key represents one unit of the set: teaspoons "t", tablespoons "T", cups "C", pounds "LB" or ounces "OZ".

Control keys 14 through 21, include an on/off key 14, an original serving size scroll up key 15, an original serving size scroll down key 16, a new serving size scroll up key 17, a new serving size scroll down key 18, a half recipe key 19, a double recipe key 20, and a new amount key 21.

Figure 2:
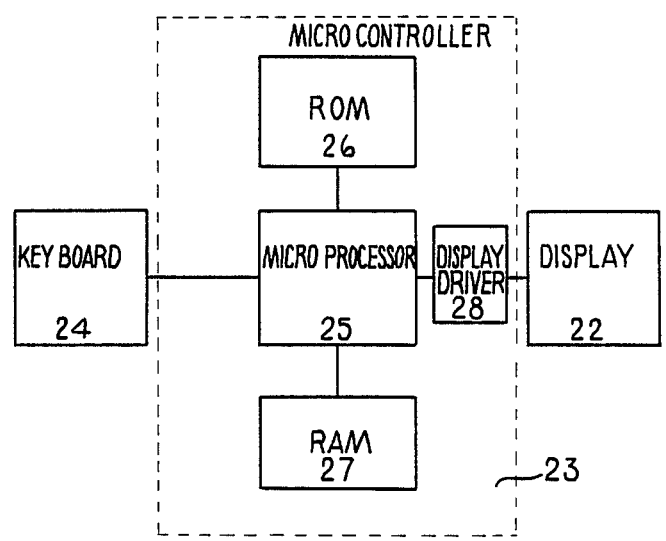
FIG. 2 is a block schematic diagram of a recipe calculator circuit.

Referring now also to FIG. 2, the circuitry of recipe calculator 10 is shown in block schematic form. The heart of the recipe calculator 10 is microcontroller 23 which includes microprocessor 25, read only memory (ROM) 26, random access memory (RAM) 27 and display driver 28. ROM 26, RAM 27 and display driver 28 are all operably connected to microprocessor 25 and are, in this one preferred embodiment, contained in the same integrated circuit package. Keyboard 24 is operably connected to microcontroller 23 at an input on microprocessor 25. Display 22, whether a liquid crystal or a light emitting diode display, is also operably connected to microcontroller 23 at the output of display driver. 28. ROM 26 is configured to promote single key stroke calculations which provide a recipe calculator 10 which is easy to use and requires no special training. ROM 26 is further configured to round the calculated ingredient amount to the nearest convenient fraction for a particular unit of measure.

In WONG, Pat. No. 4,649,810, a recipe for Coq An Vin is given as a matter of example and will be used here for the same. The recipe is as follows: three tablespoons butter, one-quarter pound minced salt pork, three-quarters cup chopped onions, one carrot, one clove garlic, three minced shallots, one disjointed chicken, two tablespoons flour, two tablespoons minced parsley, chopped fresh chervil to taste, thyme to taste, salt to taste, pepper to taste, bay leaf to taste, and one and one-half cups dry red wine, and one-half pound sliced mushrooms. It is assumed here for the sake of example, that this particular recipe will make six servings and we desire to make eight servings. Without the recipe calculator 10 one would have to multiply each ingredient amount by one and one-third which is quite cumbersome when dealing with say the flour ingredient which requires two tablespoons, which would require carrying out the multiplication and then converting the remainder of two-thirds of a tablespoon to its equivalent number of teaspoons.

Figure 1B:
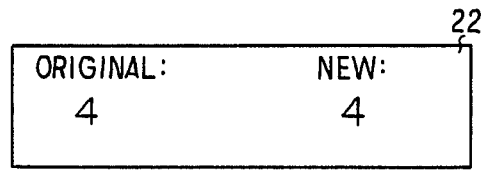
FIG. 1b is a top plan view of a display.

To use the recipe calculator 10 the cook simply presses on/off key 14 to activate the device. Upon activation, display 22 displays "original:" serving size "4" and "new:" serving size "4" as shown in FIG. 1b. The operator then presses original serving size scroll up key 15 until "6" appears on display 22 under the word "original:". The operator then presses new serving size up scroll key 17 until an "8" appears on display 22 under the word "new:". Recipe calculator 10 automatically calculates the multiplier, which in this case would be one and one-third or 1.333, and stores this multiplier in RAM 27, upon the new amount key 21 being depressed. The operator then keys each ingredient amount into recipe calculator 10. Starting with butter, the operator presses the integer key "3" contained in numeric keypad 11, then the operator presses the tablespoon key "T" contained in the units keypad 13 and the new amount key 21. Recipe calculator 10 will then display "4T", since that is the result of multiplying 1.333 times three tablespoons. The ingredients minced salt pork and chopped onions are entered in the same manner. For the ingredient one carrot, the operator presses the "1" contained in the numeric key pad 11 and then simply presses the new amount key 21. Because a carrot is unitless, no units key need be pressed. Display 22 will then display "1⅓" which corresponds to the necessary amount of carrots. The ingredients of a clove of grlic, minced shallots and disjointed chicken are entered in the same manner. For the flour ingredient the operator simply presses the "2" key of numeric keypad 11, then the tablespoon key of the unit keypad 13 and the new amount key 21. Display 22 will then display "2T and 2t". Sometimes, as might be the case here, it is more convenient to use a single utensil for measuring, i.e. a teaspoon rather than both a tablespoon and a teaspoon, or just tablespoons and teaspoons rather than cups and teaspoons. Recipe calculator 10 provides an alternate display mode wherein the operator simply presses the new amount key 21 again and the recipe calculator 10 will display the equivalent measure which in this case is "8t" only requiring the use of a single teaspoon measuring utensil. Recipe calculator 10 will not provide the alternate form if it is deemed to be excessive, for example, 25 teaspoons. The rest of the ingredients for the Coq An Vin are calculated as outlined above. While in the WONG patent, the inventor would not guarantee the epicurean results, using my new recipe calculator 10 will guarantee, that no matter how badly it tastes in the end, you will at least begin cooking with the proper ingredient amounts.

Recipe calculator 10 also provides two quick key calculations, specifically a half recipe key 19 and double recipe key 20, which eliminate the need to enter in the original and new serving sizes for halving and doubling recipes.

While there is shown and described the present preferred embodiment of the invention, it is to be distinctly understood that this invention is not limited thereto but may be variously embodied to practice within the scope of the following claims.

I claim:

1. A recipe calculator comprising:
   a processing means configured for calculating a first food ingredient ratio in terms of a combination of unit measurements which corresponds to the least number of measurements required;
   means for converting said food ingredient ratio to a second alternate food ingredient ratio in terms of a single measuring unit which corresponds to the least number of measuring utensils required;
   means for selecting either the first or second food ingredient ratio;
   means for entering into said processing means reference ingredient amounts and unit conversion information; and
   means for displaying said calculated food ingredient ratios, where said means for displaying is connected to said processing means and said converting means.

2. The recipe calculator of claim No. 1 wherein the processing means and converting means comprise a microcontroller.

3. The recipe calculator of claim No. 2 wherein the microcontroller comprises:
   a microprocessor for processing digital information;
   a read only memory device connected to, and controlling the operation of, said microprocessor;
   a random access memory device connected to said microprocessor for storing digital information; and
   a display driver connectd to said microprocessor for outputting digital information from said microprocessor.

4. The recipe calculator of claim No. 1 wherein the means for entering comprises a plurality of contact keys for generating electrical digital signals.

5. The recipe calculator of claim No. 4 wherein the plurality of contact keys comprises:
   a ten key numeric keypad, where each key of the key pad corresponds to a unique digit, zero through nine;
   a six key fractional keypad, a first key of the fractional key pad which corresponds to the fraction ⅛, a second key of the fractional key pad which corresponds to the fraction ¼, a third key of the fractional key pad which corresponds to the fraction ½, a fourth key of the fractional key pad which corresponds to the fraction ¾, a fifth key of the fractional key pad which corresponds to the fraction ⅓, and a sixth key of the fractional key pad which corresponds to the fraction ⅔;
   a five key units keypad, a first key of the unit's key pad which corresponds to the unit of teaspoons, a second key of the unit's key pad which corresponds to the unit of tablespoons, a third key of the unit's key pad which corresponds to the unit cups, a fourth key of the unit's key pad which corresponds to the unit pounds, and a fifth key of the unit's key pad which corresponds to the unit ounces;

a plurality of individual keys corresponding to control keys.

6. The recipe calculator of claim No. 1 wherein the display means comprises a liquid crystal display device connected to said processing means for displaying the output of said processing means.

7. The recipe calculator of claim No. 1 wherein the display means comprises an array of light emitting diodes conneted to said processing means for displaying the output of said processing means.

8. A recipe calculator comprising:

microcontroller being configured for calculating food ingredient ratios both in terms of a combination of measuring units which corresponds to the least number of measurements required and in terms of a single measuring unit which corresponds to the least number of measuring utensils required;

a new amount key for selecting either a food ingredient ratio in terms of a combination of measurement units or in terms of a single measuring unit;

a ten key numeric keypad connected to said microcontroller, each key of which corresponding to a unique digit, zero through nine, for entering numeric digits into said microcontroller;

a six key fractional keypad, one key of which corresponding to the fraction one-eighth, another key of which corresponding to the fraction one-quarter, another key of which corresponding to the fraction one-half, another key of which corresponding to the fraction three-quarters, another key of which corresponding to the fraction one-third, and yet another key of which corresponding to the fraction two-thirds, said fractional keypad being used to enter fractions into said microcontroller;

a five key unit keypad connected to said microcontroller, one key of which corresponding to the unit of teaspoons, another key of which corresponding to the unit of tablespoons, another key of which corresponding to the unit of cups, another key of which corresponding to the unit of pounds, and yet another key of which corresponding to the unit of ounces, said unit keyboard being used for entering unit information into said microcontroller;

a plurality of individual control keys each connected to said microcontroller for entering control code into said microcontroller; and display means connected to said microcontroller for displaying the output of said microcontroller where the output is displayed as a numerical amount including the corresponding units indicia.

9. The recipe calculator of claim No. 8 wherein the microcontroller comprises:

a microprocessor for processing digital information;

a read only memory device connected to said microprocessor and configured for controlling the opertion of said microprocessor;

a random access memory device connected to said microprocessor for storing digital information;

a display driver means connected to said microprocessor for outputting digital information from said microprocessor.

10. The recipe calculator of claim No. 8 wherein the plurality of individual control keys comprises:

a on/off key connected to said microcontroller for activating and deactivating the same;

two original and two new serving size scroll keys connected to said microcontroller for selecting original and new serving sizes;

a half recipe key connected to said microcontroller for facilitating immediate calculation of one-half of an ingredient amount;

a double recipe key connected to said microcontroller for facilitating immediate calculation of twice of an ingredient amount;

a new amount key connected to said microcontroller for activating the computation and display of a new ingredient amount and an alternate and equivalent display amount.

11. The recipe calculator of claim No. 8 wherein the display means comprises a liquid crystal display device connected to said microcontroller for displaying the output of said microcontroller.

12. The recipe calculator of claim No. 8 wherein the display means comprises an array of light emitting diodes connected to said microcontroller for displaying the output of said microcontroller.

* * * * *